United States Patent [19]

Anderson

[11] 4,018,449
[45] Apr. 19, 1977

[54] AUTOMATIC BRAKING DEVICE FOR NESTING CART

[75] Inventor: Anders Anderson, Walden, N.Y.

[73] Assignees: Patrick Suo, Maybrook; Arthur Concors, Walden, both of N.Y.; part interest to each

[22] Filed: Dec. 16, 1975

[21] Appl. No.: 641,295

[52] U.S. Cl. .................. 280/33.99 C; 188/2 D; 188/19; 188/21; 188/29; 188/167

[51] Int. Cl.² ............................................ B62B 5/04

[58] Field of Search ............ 280/33.99 C, 33.99 A, 280/33.99 R; 188/167, 19, 20, 21, 28, 29, 31, 2 R, 2 F, 2 D, 69

[56] References Cited

UNITED STATES PATENTS

| | | | |
|---|---|---|---|
| 1,872,146 | 8/1932 | Jackson | 188/20 |
| 3,015,494 | 1/1962 | Fosbrook, Sr. | 280/33.99 A |
| 3,095,211 | 6/1963 | Altherr | 280/33.99 C |
| 3,174,768 | 3/1965 | Sanders et al. | 280/33.99 C |
| 3,376,954 | 4/1968 | Neptune | 280/33.99 C X |
| 3,458,015 | 7/1969 | Collins et al. | 280/33.99 C |
| 3,501,164 | 3/1970 | Peterson | 280/33.99 C |

FOREIGN PATENTS OR APPLICATIONS

| | | | |
|---|---|---|---|
| 91,076 | 2/1968 | France | 280/33.99 C |

*Primary Examiner*—Robert R. Song
*Assistant Examiner*—Milton L. Smith
*Attorney, Agent, or Firm*—Ronald S. Cornell

[57] ABSTRACT

A cart having a spring biased wheel lock, handle actuated release means for the lock, automatic lock release means actuated by a nested cart, and an intercart coupling means.

9 Claims, 9 Drawing Figures

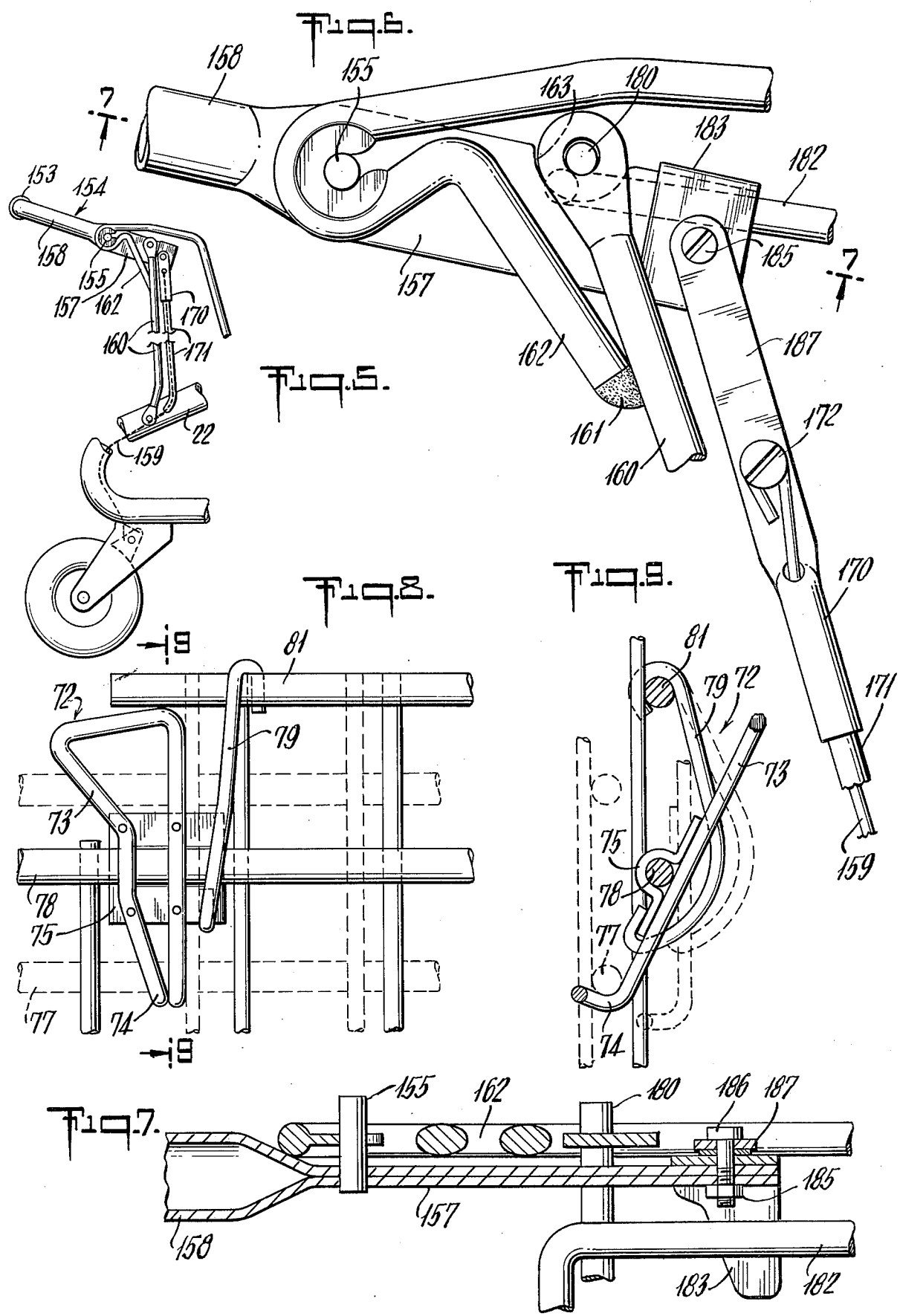

AUTOMATIC BRAKING DEVICE FOR NESTING CART

This invention relates to an improved shopping cart construction and more specifically, to a shopping cart having an automatic braking device to prevent unintentional movement of the cart, said braking device being automatically released upon the normal actions of the person using the cart without the necessity of such person consciously releasing any braking mechanism.

The shopping carts commonly used in supermarkets and like shopping areas are not provided with any braking means. Accordingly, these carts tend to cause damage as, for example, to parked vehicles in the supermarket parking lot because they tend to roll down inclines or because of gusts of wind or "playful" children. In the past, various suggestions have been made that shopping carts be provided with brake means in order to prevent such happenings. These braking devices, however, have not been found to be commercially successful; some apparently because they require the conscious action of the user in order to actuate the brake, others because they have been applied to only a single wheel of the shopping cart thereby permitting the cart to pivot around the locked wheel even though the brake has been applied. In addition, past devices were unable to prevent the conscious actions of destruction by juveniles or other parties. Furthermore, many of these devices have been undesirable because it has been necessary to individually release the brakes on all of the carts in a row when they have been stacked for movement from the parking lot to the store.

In accordance with the present invention these disadvantages have been overcome by the provision of a braking mechanism which positively locks both rear wheels of the shopping cart automatically as soon as the handle of the shopping cart is released and, similarly, automatically releases these brakes by the mere act of resting one's hands upon the handle in order to propel it. In addition, there is provided means to release the brakes upon the upward swinging movement of the rear wall of the shopping cart when one of the shopping carts is stacked with another from the rear thereby leaving only the last shopping cart in the row with a brake in locked position. Finally, there is provided means to secure two or more stacked carts to each other whereby to prevent the forward carts from rolling away from the remainder of the series of carts while they are being propelled.

In a more specific embodiment of the invention there is provided an improved braking means which is adapted to positively lock each rear wheel against movement in either direction, such locking device being readily releasable with a minimum of applied force.

All of the above advantages are achieved by the present invention without requiring the addition of a special brake actuating handle, the improved results being obtained by simply applying downward pressure to the handle which is normally provided for such carts.

The invention resides in certain novel features of the apparatus and in the combination and arrangement of the parts thereof. The above described advantages of the invention and others will become apparent to those skilled in the art to which the invention pertains from the following description of the embodiments thereof described with reference to the accompanying drawings in which:

FIG. 5 is a partial side elevational view of another embodiment of the invention;

FIG. 6 is an enlarged view of the handle portion of the embodiment of the shopping cart shown in FIG. 5;

FIG. 7 is a cross-sectional view taken on line 7—7 of FIG. 6;

FIG. 8 is a side elevational view of the mechanism for locking together two nested carts with a portion of the second cart being shown by dotted lines; and FIG. 9 is a cross-sectional view of the locking mechanism taken on line 9—9 of FIG. 8.

Figure 1:
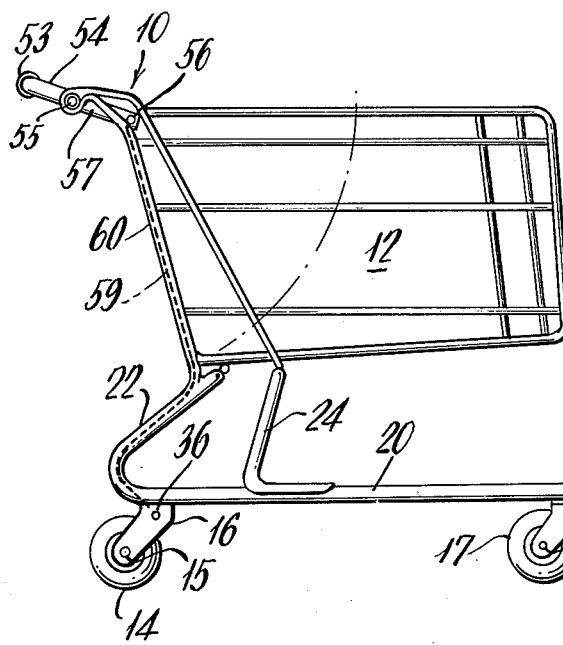
FIG. 1 is a side elevational view of an embodiment of a shopping cart made in accordance with the invention.

Referring now to the drawings, shopping cart 10 is of common construction and includes a basket 12 positioned and secured in place on a supporting structure which includes wheels 14,17 rotatably mounted on axle pins 15,18 which in turn are mounted in wheel forks 16,19. Corresponding wheels on the far side of the cart are not seen.

Base member 20 is affixed to the wheel forks and a bent extension 22 thereof together with member 24 and cross members, not shown, support the basket 12 which includes an open top, a closed bottom, front and sides, and a pivotally depending rear gate; all in known manner.

Figure 3:
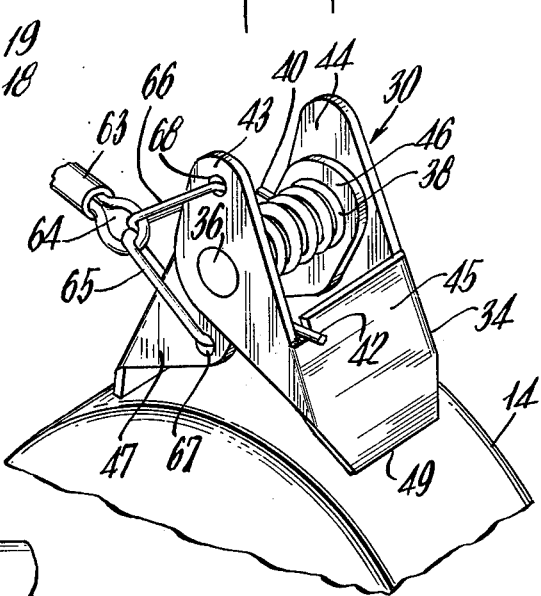
FIG. 3 is an isometric view of the positive locking brake, shown in position on a portion of one rear wheel.
Figure 2:
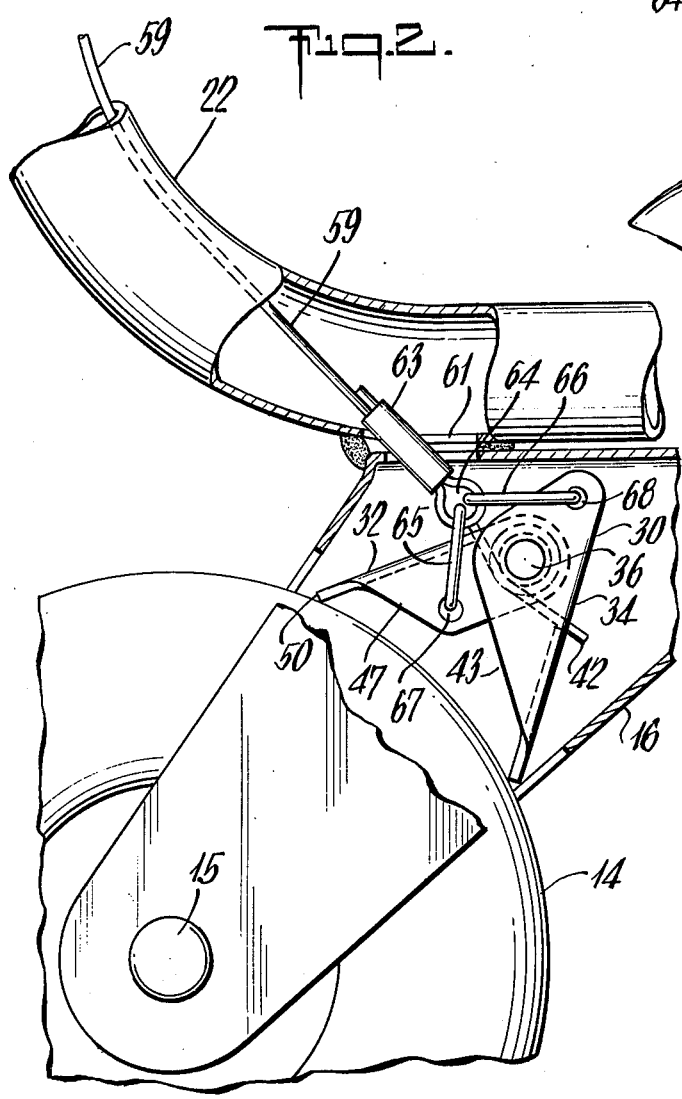
FIG. 2 is an enlarged view of the portion of the shopping cart of FIG. 1 near one of the rear wheels thereof with part of the structural wall being broken away to show the brake mechanism.

A positive action, normally locked, wheel lock 30 (FIGS. 2, 3 and 4) for each rear wheel is positioned within, and protected from deliberate or accidental damage by, wheel fork 16. Each wheel lock 30 is comprised of a pair of opposing spring loaded pawls 32,34 pivotally mounted on stationary anchor pin 36 which is supported on the inner and outer walls of wheel fork 16. A torque spring 38 is coaxially positioned around anchor pin 36. The ends 40,42 of spring 38 are extended in order to enable them to bear against the opposing pawls 32,34 to bias them into locking position on the periphery of the wheel.

Figure 4:
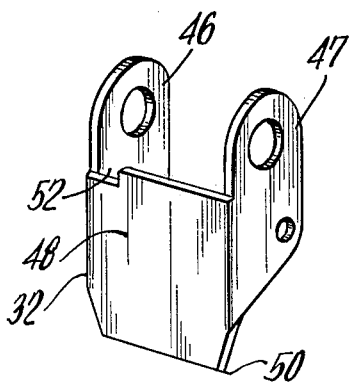
FIG. 4 is an isometric view of one locking element of the brake which element is partially hidden from view in FIG. 3.

Pawl 34 is formed with two parallel arms 43,44 extending transversely to wall 45. Similarly pawl 32 includes arm 46, 47 and wall 48. Outer edges 49,50 of walls 45,48 are adapted to bear against the outer periphery of wheel 14 and spring 38 keeps these edges biased towards each other to positively lock wheel 14 against movement. Upon incipient movement of wheel 14 in either direction wheel lock 30 will tend to rotate around anchor pin 36 whereby to increase the locking force. The corners of the locking edge may be chamfered as shown for edge 50 in FIG. 4. The upper end of walls 48 and 50 may include a notch 52 as shown in FIG. 4 to provide a seat for the extended end of spring 38.

The wheel locks 30 are readily released by gentle downward pressure on base portion 53 of U-shaped handle 54 of cart 10. Such action causes the handle to pivot around pin 55 (FIG. 1) thereby raising the extended leg 57 of the handlebar. A cable 59 is fixed to leg 57 by suitable means such as bolt 56. As leg 57 is raised it moves cable 59 upwardly. Cable 59 is desirable threaded through hollow frame member 60 and hollow extension 22 of base member 20 and exits through aperture 61 into wheel fork 16. Cable 59 is bent back upon itself and secured by means 63 leaving an eye 64 through which are passed two brake release actuating members 65,66 which will also advantageously be formed of heavy wire or cable. Actuators 65, 66 are passed through suitably located holes 67,68 in wheel lock pawls 32,34 and act to spread the wheel contacting edges 49,50 upon upward movement of cable 59 caused by downward movement of handle 54.

The spring tension of spring 38, the distance between apertures 67,68 in arms 43,47 and the relative distances between pin 55 and the base portion of U-shaped handle 54 and the cable connection point 56 on leg extension 57 of the handle all interact to determine the force required to release wheel locks 30. Such variables will advantageously be selected so that minimal pressure on handle 54 will release the lock. Heavy tension on wheel lock elements 32,34 is unnecessary since positive locking action in either direction is provided by the acute angles of contact thereof with the wheel 14 and the increasing locking force provided by rotation of the wheel lock pawls 32,34 around anchor pin 36 upon movement of wheel 14.

FIGS. 5 and 6 show another embodiment of linkage mechanism in which U-shaped handle 154 with legs 158 is pivoted at 155 on frame member 162 which is welded at 161 to frame member 160. Downward movement of the base portion 153 of handle 154 causes extended, flattened leg 157 to move upwardly carrying with it member 170 which telescopes over hollow tube 171. Tube 171 is fixed to bent base extension 22 and the hollow interior of both members communicate with each other to permit flexible cable 159 to pass therebetween. The lower end of cable 159 is attached to the wheel lock 30 in the same manner as depicted with reference to the embodiment shown in FIG. 1. The upper end of cable 159 is secured to element 170 by any suitable means. In the embodiment shown, cable 159 passes through the wall of element 170 and around a retaining bolt 172. As handle 154 is depressed and element 170 raised, it carries cable 159 with it, thereby releasing wheel locks 30.

The upper end of frame member 160 pivotally supports horizontal rod 180 which forms the upper end of the cart's rear gate which depends from and is supported by rod 180. One end frame member 182 of the rear gate is shown in FIGS. 6 and 7 in raised position as if a second cart were nested within the cart in known manner. Frame member 182 is affixed to rod 180 in any suitable manner such as by welding it thereto.

As a second cart enters a first from behind thereby raising the rear gate, said gate contacts a linkage actuating stop member 183 which extends inwardly from the side of the cart. When the second cart is completely nested, member 182 is in its full upward position and stop 183 has been raised and has actuated the linkage mechanism whereby to release wheel lock 30. In the embodiment shown, stop 183 is an L-shaped metal element secured in place on extended leg 157 of handle 154 by nut 185 and bolt 186 which also serve to secure flattened end 187 of element 170. A portion of extended leg 157 is cut away, 163, as shown in dotted lines in FIG. 6 to permit pivotal movement of the handle around shaft 155 without interference from rod 180. A stop means (not shown) similar to stop 183 is also used in the embodiment shown in FIG. 1.

The automatic wheel lock release means actuatable upon nesting of the carts enables a multiplicity of carts to be moved together as from a parking lot to an "in-store" storage location. In order to further facilitate the simultaneous transportation of a plurality of carts there is provided an intercart coupling device 72 depicted in FIGS. 8 and 9. Cart coupler 72 includes latch means 73 with a hooked end 74 for engagement with a horizontal rod 77 of the basket of the nested cart (shown in broken lines). Latch 73 is fixed to a metal plate 75 which is shaped to pivot about a corresponding horizontal rod 78 of the basket on the outer chart. Also fixed to plate 75 is one end of a snap action spring 79 which has the other end fixed to the upper horizontal rod 81 of the outer cart. Snap spring 79 holds latch 73 firmly in either "coupled" or "uncoupled" position. In FIG. 9 the cart coupler is shown in coupled position in full lines and uncoupled position in dotted lines. The latch member 73 is advantageously formed from a metal rod of substantial, i.e. one-eighth inch, diameter bent as shown in FIG. 8 to provide a substantial finger contact area to afford easy coupling and uncoupling of carts without fumbling. It can, of course, also be made of other materials as will be evident to one skilled in the art.

The novel features of the invention described herein permits movement of the shopping cart to be effectively prevented simply by removal of the operator's hand from the handle. No special levers or other positive control means are present to confuse the user. To move the cart the user naturally leans his hand on the handle; in so doing, the wheel locks are automatically released, only slight pivotal movement of the handle being necessary to accomplish that effect. By virtue of the provision of linkage actuating stop member 183 all of the wheels in a series of nested carts will be free to roll except the last cart which will remain locked, keeping the train from rolling wild when not attended, and the cart coupler permits simultaneous movement of the train of carts without possibility of separation thereof.

The preferred provision of positive action wheel locks on both rear wheels as well as the feature of positive locking action in both directions makes it impossible for a cart to swivel around one wheel and thereby cause damage to parked cars, etc. Unintended movement of the cart is avoided even on slopes or in high winds.

It is to be understood that the form of this invention as herein shown and described is only representative of the inventive concepts disclosed and hence various changes may be made without departing from the spirit and scope of the invention as defined in the appended claims.

What is claimed is:

1. A wheeled cart having a handle with which to propel said cart; a normally locked wheel lock for at least one wheel of said cart; said wheel being mounted on an axle; said wheel lock comprising means for locking said wheel against forward motion comprising a first member having an edge bearing transversely against the periphery of said wheel, said first member being rotatably mounted on a pivot, said pivot extending in the same direction as the axle of said wheel and being positioned radially outward from the periphery of said wheel and forward of said bearing edge whereby forward pressure on said locked wheel causes said first member to tend to rotate about said pivot thereby increasing the locking force; and means for locking said wheel against rearward motion comprising s second member having an edge bearing transversely against the periphery of said wheel, said second member being rotatably mounted on a pivot, the pivot on which said second member is mounted extending in the same direction as the axle of said wheel and being positioned radially outward from the periphery of said wheel and rearward of the bearing edge of said second member, whereby rearward pressure on said locked wheel causes said second member to tend to rotate about said pivot thereby increasing the locking force; and release means for releasing said means for locking said wheel against forward and rearward motion.

2. The cart of claim 1 wherein said handle is of U-shaped configuration, the legs thereof are pivotally connected to the structural frame of said cart at a point intermediate the base thereof and the ends of the legs, and one end of a cable is connected to one of said legs the other end thereof being connected to said wheel lock release said wheel lock.

3. The cart of claim 2 wherein said cable is threaded through and protected by a frame member of said cart.

4. The cart of claim 2 and further including means to automatically release said wheel lock when a second cart is nested therewith.

5. The cart of claim 4 wherein said automatic release means comprises a stop means fixed to one of the legs of said handle between the pivot point and the end thereof, said stop means extending inwardly, and said cart is provided with a pivotally mounted, depending, rear gate which swings inwardly and upwardly when another cart is nested from behind, said stop being adapted to be contacted by said gate as it swings whereby said stop is raised, causing said handle to pivot and said wheel lock to be released.

6. The cart of claim 1 and further including means to couple the cart to a second cart.

7. The wheeled cart of claim 1 wherein said release means is actuated by downward pressure on said handle.

8. The wheeled cart of claim 1 wherein said first and second members are both mounted on the same pivot and the bearing edge of said second member, for preventing rearward motion, is forward of the bearing edge of said first member, for preventing forward motion; and said release means operates by rotating the members about said pivot in opposite directions so that the distance between said bearing edges is increased, whereby they move out of contact with said periphery of said wheel.

9. A wheeled cart having a basket structure formed of spaced horizontal and vertical rods and shaped to nest with a second cart having a similar basket structure, and coupling means for removably attaching said wheeled cart to a second, nested cart, said coupling means comprising a latch adapted to interconnect the carts, said latch being connected to a plate which is pivotally mounted on a horizontal rod which forms a portion of a side wall of the basket of said first cart, and snap spring means connected to said plate and to a second horizontal rod forming a portion of said side wall, said snap spring means being adapted to snap said latch between two positions, a first position at which said latch engages a rod on the side wall of the basket of said second cart whereby the cart is coupled thereto and a second position at which said coupling means is deactivated.

* * * * *